Nov. 12, 1940.   W. H. COOK   2,221,701
WIRE TWISTING MACHINE
Filed Jan. 8, 1940
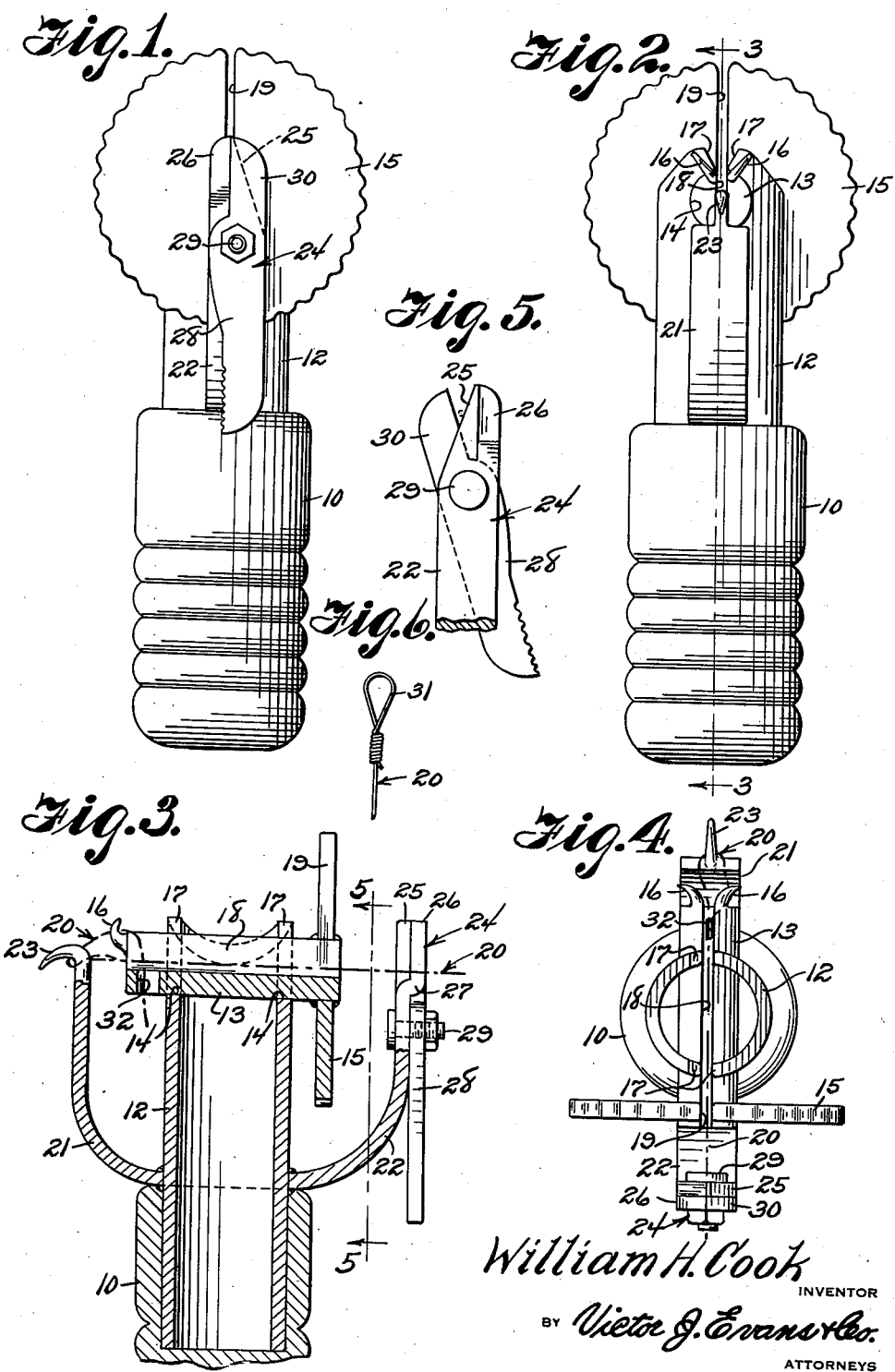
William H. Cook
INVENTOR
BY Victor J. Evans & Co.
ATTORNEYS Patented Nov. 12, 1940

2,221,701

UNITED STATES PATENT OFFICE 2,221,701

WIRE TWISTING MACHINE

William Henry Cook, Collier City, Fla., assignor to A. Brownlee and Fred Brownlee, both of Collier City, Fla.

Application January 8, 1940, Serial No. 313,011

3 Claims. (Cl. 140—122)

This invention relates to wire twisting machines and more particularly to devices of this type for forming a loop on the end of the wire leader of a fishing hook.

An object of the invention is to provide a simple tool which may be held in one hand while the other hand is used to rotate a hand wheel carrying a mandrel provided with a slot to receive the wire and with a hook around which, and another hook carried by the handle, the wire leader is trained so that by simply turning the hand wheel the wire will be rapidly twisted upon itself to form a neat eye or loop on the end of the leader to receive the fishing line.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a front elevation of a wire twisting tool constructed in accordance with the invention Figure 2 is a rear elevation of the tool shown in Figure 1.

Figure 3 is a longitudianl sectional view of the tool taken on the line 3—3 of Figure 2.

Figure 4 is a top plan view of the tool.

Figure 5 is a detail rear elevation of the combined holder and cutter.

Figure 6 is a side elevation of the eye or loop and the twist made in a leader by the device.

Referring now to the drawing in which like characters of reference designate similar parts in the various views, 10 designates a handle preferably formed of a short circumferential grooved cylinder of any preferred material. A tubular bearing member 12 extends upwardly from the handle. A transversely disposed cylindrical mandrel 13 is rotatably mounted in openings 14 formed at diametrically opposite points in the bearing member, as best shown in Figure 3. A hand wheel 15, in the nature of a circumferentially milled disc, is fixed to one end of the mandrel in any preferred manner. The end of the mandrel opposite the hand wheel is provided with a pair of horns or twisting hooks 16, best shown in Figure 4.

The bearing member 12, the mandrel 13, and the wheel 15 are provided with respective slots 17, 18 and 19, best shown in Figures 2 and 3, through which the end of the leader wire 20, opposite the fishing hook, is trained. One of the hooks 16 is disposed on each side of the slot 18 in the mandrel, as best shown in Figure 4.

As best shown in Figure 3 a pair of arms 21 and 22 are secured at the lower ends to diametrically opposite points on the bearing member 12 near the handle and these arms are arcuate in contour and extend upwardly along the bearing member in the nature of a yoke.

The arm 21 located at that end of the mandrel which carries the hooks 16 has its upper end formed to provide an upwardly and outwardly curved horn or hook 23 for engaging the end portion of the wire leader 20. The arm 22 located adjacent to that end of the mandrel which carries the wheel 19 is provided with a combined holder and cutter designated in general by the numeral 24.

The combined holder and cutter comprises a pair of jaws 25 and 26 which are integral with the upper end of the arm 22 and are adapted to receive between them the wire leader 20. The jaw 26 is offset as shown at 27 near its lower end so that the upper end of the jaw extends laterally of the jaw 25 as best shown in Figure 3. The movable member of the combined holder and cutter comprises a short lever 28 which is pivotally mounted on the arm 22 by a pivot pin 29 of any preferred type disposed below the offset portion of the jaw 24. The lever terminates in a jaw 30 which has wiping engagement with the side of the jaw 25 when the lever is rocked on its pivot to engage the jaw 30 for holding the leader wire 20 stationary to permit the twist to be formed.

In operation the leader wire 20 is trained through the slots of the bearing member, the mandrel, and the wheel and the free end therefor, in which an eye 31 is to be formed, is trained underneath the hook 23 of the stationary arm 20, then is trained back over one of the hooks 16 and then is trained downwardly through a guide opening 32 formed in the end of the mandrel at the bottom of the slot 18 near the hooks 16, as best shown in Figure 3.

To form the twist the handle is held in the operator's left hand and the ball of the left thumb is placed against the end of the lever 28 to hold the jaw 26 of the lever in position to clamp the leader wire 20 stationary against the stationary jaw 25. Assuming that the leader wire is trained through the device as just described, the fingers of the right hand may now be placed against the periphery of the wheel 15 and the wheel rotated clockwise during which movement the hook 16 will be rotated in an annular path by the mandrel to wrap the end of the leader wire around that portion of the leader wire which extends longitudinally in the slot in the mandrel to form a compact neat twist, as shown in Figure 6. After the twist has been completed the leader wire may be lifted out of the slot in the mandrel and the eye or loop 31 disengaged from the stationary hook 23.

By referring to Figure 5 it will be seen that the rear edge of the jaw 25 is inclined relatively to the front edge of the jaw. Consequently when a wire leader is placed between this inclined edge of the jaw 25 and the jaw 30 moved in the direction of the arrowhead the wire will be severed.

From the above description it is thought that the construction and operation of the invention will be fully understood without further explanation.

What is claimed is:

1. A wire twisting machine comprising a bearing member, a slotted mandrel journalled in the bearing member provided with a guide opening at the base of the slot near one of its ends, twisting hooks on said end on opposite sides of the slot, a rotating means secured to the mandrel at the end remote from the hooks, a wire gripping jaw spaced from and aligned with the slot at the first named end of the mandrel, and an outwardly curved stationary hook spaced from and aligned with the axis of the mandrel adjacent to said twisting hooks.

2. A wire twisting machine comprising a handle, a bearing member extending upwardly from the handle, a transversely disposed mandrel journalled in the bearing member and provided with a longitudinal slot, a pair of twisting hooks formed adjacent one end of the mandrel on opposite sides of the slot, a handwheel fixed to the end of the mandrel remote from the hooks having a slot adapted to register with the slot in the mandrel, arms curved upwardly from the bearing member on opposite sides thereof to and spaced from the ends of the mandrel, and an upward and outwardly directed stationary hook extending from one of said arms near one end of the mandrel in alignment with the axis of the mandrel, and a gripping means mounted on the other arm adjacent the other end of the mandrel.

3. A wire twisting machine comprising a bearing member, a slotted mandrel journalled in the member adapted to receive a wire within the slot, a rotating means mounted on the mandrel, wire twisting hooks on one end of the mandrel disposed on opposite sides of the slot therein, curved arms extending from the bearing member in spaced relation to the mandrel ends, a wire retaining outwardly directed hook on one of the arms spaced from the twisting hooks, a gripping means pivoted on the other arm adapted to hold the portion of wire resting in the slot in the mandrel, and a guide opening in the slot in the mandrel through which the free end of the wire may be passed.

WILLIAM HENRY COOK.